(12) United States Patent
Arunapuram et al.

(10) Patent No.: US 8,924,007 B2
(45) Date of Patent: Dec. 30, 2014

(54) THREE DIMENSIONAL LOAD PACKING

(75) Inventors: Sundararajan Arunapuram, West Chester, PA (US); Sairajesh Mahabhashyam, Little Rock, AR (US); Albert Drummond, Yardley, PA (US)

(73) Assignee: Oracle International Corporation, Redwood Shores, CA (US)

( * ) Notice: Subject to any disclaimer, the term of this patent is extended or adjusted under 35 U.S.C. 154(b) by 670 days.

(21) Appl. No.: 13/108,228

(22) Filed: May 16, 2011

(65) Prior Publication Data

US 2012/0158385 A1 Jun. 21, 2012

Related U.S. Application Data

(60) Provisional application No. 61/424,286, filed on Dec. 17, 2010.

(51) Int. Cl.
*G06F 7/00* (2006.01)
*G06Q 10/04* (2012.01)
*G06Q 10/08* (2012.01)

(52) U.S. Cl.
CPC ............. *G06Q 10/04* (2013.01); *G06Q 10/083* (2013.01)
USPC ................ 700/229; 703/1; 700/216; 700/226

(58) Field of Classification Search
USPC ........................................................ 700/229
See application file for complete search history.

(56) References Cited

U.S. PATENT DOCUMENTS

| | | | |
|---|---|---|---|
| 6,721,762 B1 * | 4/2004 | Levine et al. .......................... 1/1 |
| 8,340,812 B1 * | 12/2012 | Tian et al. ..................... 700/216 |
| 2003/0163292 A1 * | 8/2003 | Eckenwiler et al. .............. 703/1 |
| 2006/0020366 A1 * | 1/2006 | Bloom .......................... 700/226 |

OTHER PUBLICATIONS

"Oracle Transportation Management"; http://www.oracle.com/us/products/applications/ebusiness/scm/018756.htm; viewed May 13, 2011.

* cited by examiner

*Primary Examiner* — Gene Crawford
*Assistant Examiner* — Kyle Logan
(74) *Attorney, Agent, or Firm* — Miles & Stockbridge P.C.

(57) ABSTRACT

One embodiment is a three dimensional load method for simulating loading of items into at least one container to be transported to at least one destination. The method includes receiving a list of items to be transported, determining at least one container as an optimal number and type of container to be used for transporting the items, and initializing an empty space list to include one space equal to a size of the at least one container. The method also includes initializing a placed item list and an unplaced item list, such that the placed item list includes a list of items already loaded on the at least one container and the unplaced item list includes a list of items to be loaded on the at least one container. The method further includes selecting a subset of items from the unplaced item list for one of the destinations and, while there are more items to be loaded on the at least one container, selecting an item, space in the at least one container, and rotation using an item iterating process, inserting the selected item into the space, the item oriented according to the selected rotation, and updating the empty space list. The method then includes updating the placed item list and the unplaced item list.

17 Claims, 9 Drawing Sheets

EMPTY SPACE SORT CRITERIA
Width, Length, Height

THREE DIMENSIONAL LOAD PACKING

CROSS REFERENCE TO RELATED APPLICATIONS

This application claims priority from provisional application Ser. No. 61/424,286, filed on Dec. 17, 2010, the contents of which is hereby incorporated by reference in its entirety.

FIELD

One embodiment is directed generally to computerized logistics and, in particular, to the three dimensional simulation of packing items into a transportation container in an optimal manner.

BACKGROUND INFORMATION

Resource allocation generally refers to the assignment of available resources to a task or goal in the most economic or optimal manner. In some instances, resource allocation may include the scheduling of activities and the resources required by those activities while taking into consideration both resource availability and time. As a result, resource allocation may involve the assessment of the value of a resource or of the effects of exploiting a resource. For example, the quantity of a resource may be determined in absolute terms, such as area, or in terms of the ability to utilize it.

One real-world application of resource allocation arises when packing items into a container for shipment on a truck, boat, or airplane. The container has a limited amount of space and is, therefore, a limited resource. It is desirable to be able to pack the most items into the container in the most economical way, while adhering to any constraints or requirements.

A traditional example or implementation of a resource allocation problem is the knapsack problem. The knapsack problem seeks, when given a set of items with a weight and value, to determine the number of each item to include in a collection so that the total weight is less than or equal to a given limit and the total value is as large as possible. For example, there may be n types of items such that each kind of item i has a value $v_i$ and a weight $w_i$, and the maximum weight that can be carried in the bag is W. The knapsack problem can be applied to a number of decision-making processes in different fields including financial applications and cryptography, as well as transportation and packing applications.

However, more complex versions of the knapsack problem, such as those that include items of different sizes, shapes, and types, with different types of equipment for loading the items, and including other packing or business constraints, require a more enhanced and developed solution.

SUMMARY

One embodiment is a three dimensional load method for simulating loading of items into at least one container to be transported to at least one destination. The method includes receiving a list of items to be transported, determining at least one container as an optimal number and type of container to be used for transporting the items, and initializing an empty space list to include one space equal to a size of the at least one container. The method also includes initializing a placed item list and an unplaced item list, such that the placed item list includes a list of items already loaded on the at least one container and the unplaced item list includes a list of items to be loaded on the at least one container. The method further includes selecting a subset of items from the unplaced item list for one of the destinations and, while there are more items to be loaded on the at least one container, selecting an item, space in the at least one container, and rotation using an item iterating process, inserting the selected item into the space, the item oriented according to the selected rotation, and updating the empty space list. The method then includes updating the placed item list and the unplaced item list.

DETAILED DESCRIPTION

One embodiment is a method for simulating three dimensional load packing. The method can be used to efficiently pack items into containers of given dimensions. For example, the items may be rectangular shaped boxes and the containers may be of different sizes and configurations. At least two constraints are present when packing such containers: weight and volume. When the volume limit is likely to be exceeded prior to the weight limit, it becomes important to make sure that the container is loaded with items in the most efficient way. Therefore, according to certain embodiments, a method is provided that allows for the packing or loading of items in the most optimal manner to maximize utilization of the container. In addition, when more than one container is available, certain embodiments can determine the number and type of containers that are needed to most efficiently load all of the items. Thus, certain embodiments can optimize the type of equipment that is being used as well as the manner of loading that equipment with the items. In this description, equipment may be referred to as resources, containers, trailers, or the like. According to certain embodiments, equipment can be anything used to store, transport, or ship items such as goods or products.

Figure 1:
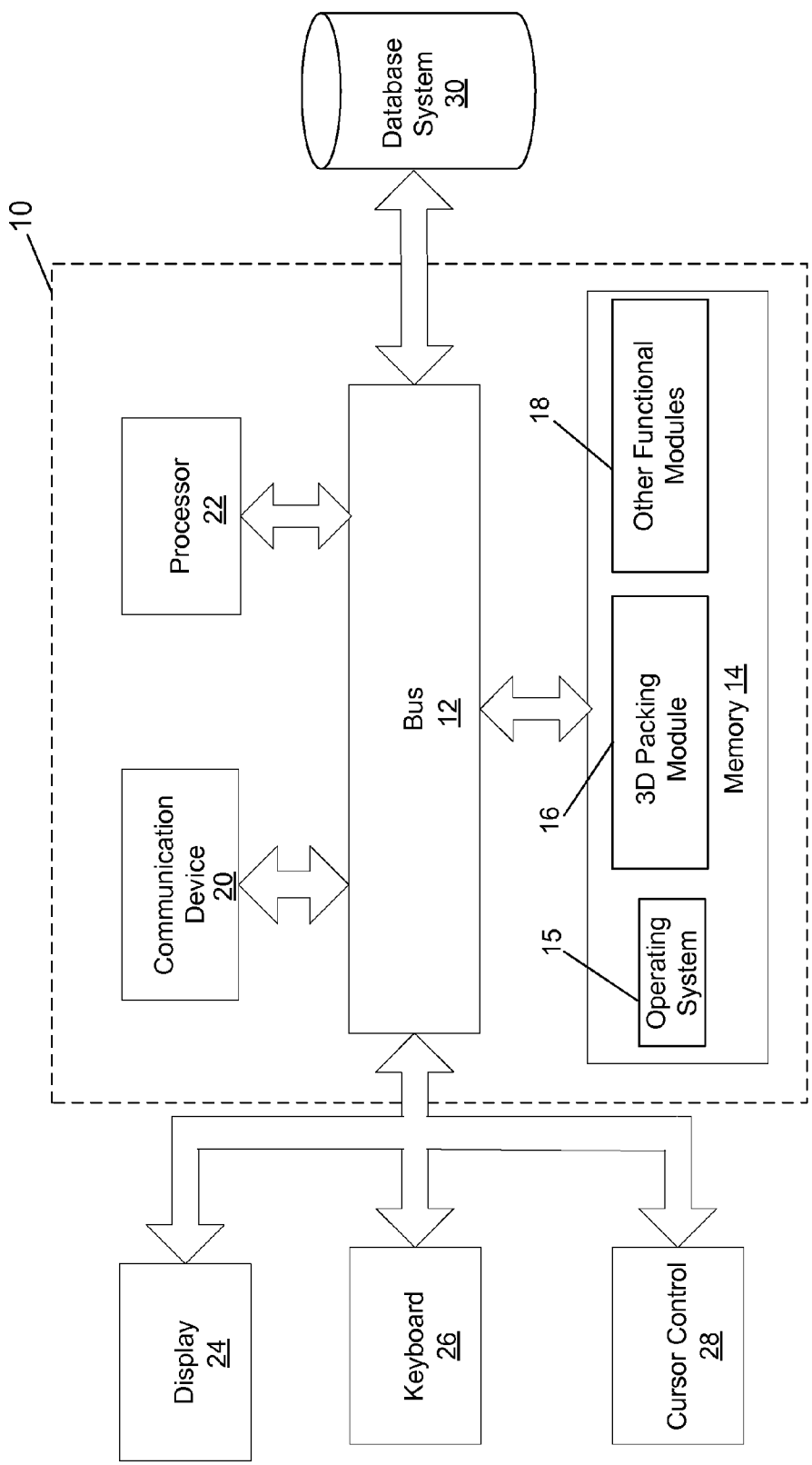
FIG. 1 illustrates a system according to an embodiment.

FIG. 1 illustrates a block diagram of a system 10 that may implement three dimensional load packing, according to one embodiment. System 10 includes a bus 12 or other communications mechanism for communicating information between components of system 10. Alternatively, the components of system 10 may communicate with each other directly without the use of bus 12.

System 10 also includes a processor 22, coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer readable media. System 10 further includes a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user, such as the load placement of a container, as will be discussed in more detail below. A keyboard 26 and a cursor control device 28, such as a computer mouse, are further coupled to bus 12 to enable a user to interface with system 10.

Processor 22 and memory 14 may also be coupled via bus 12 to a database system 30 and, thus, may be able to access and retrieve information stored in database system 30. Although only a single database is illustrated in FIG. 1, any number of databases may be used in accordance with certain embodiments. In some embodiments, database system 30 may store information related to items for shipping including their dimensions, weight, volume, destination, and any other relevant attributes. Database system 30 may store information related to containers, including their size, dimensions, attributes such as any obstructions, etc.

In one embodiment, memory 14 stores software modules that provide functionality when executed by processor 22. The modules may include an operating system 15 that provides operating system functionality for system 10. The memory may also store a three dimensional packing module 16, which can provide the functionality for simulating three dimensional load packing, according to one embodiment.

System 10 may also include one or more other functional modules 18 to provide additional functionality. For example, functional modules 18 may include a transportation management system capable of facilitating the planning and building of shipments. In one embodiment, functional modules 18 may include, for instance, the Oracle Transportation Management (OTM) system from Oracle Corporation.

Database system 30 may include a database server and any type of database, such as a relational or flat file database. Database system 30 may store attributes related to items and container, as well as constraints provided by the transportation management system or a user. Database system 30 may also store any other data required by the three dimensional packing module 16, or data associated with system 10 and its associated modules and components.

In certain embodiments, processor 22, three dimensional packing module 16, and other functional modules 18 may be implemented as separate physical and logical units or may be implemented in a single physical and logical unit. Furthermore, in some embodiments, processor 22, three dimensional packing module 16, and other functional modules 18 may be implemented in hardware, or as any suitable combination of hardware and software.

In one embodiment, three dimensional packing module 16 is configured to control system 10 to perform a process of modeling three dimensional load packing of container(s) to be transported to one or more destinations. The process may include the three dimensional packing module 16 receiving or retrieving a list of items to be transported. The list may be stored in database system 30, as discussed above, or may be received from an external system or database. Three dimensional packing module 16 may then determine at least one container as the optimal number and type of container to be used for transporting the items, and initialize an empty space list to include one space equal to the size of the at least one container.

Three dimensional packing module 16 also initializes a placed item list and an unplaced item list. The placed item list includes a list of items already loaded on the at least one container and the unplaced item list includes a list of items to be loaded on the at least one container. These lists may be stored in database system 30. Three dimensional packing module 16 then selects a subset of items from the unplaced item list for one of the destinations and, while there are more items to be loaded on the at least one container, three dimensional packing module 16 selects an item, space in the at least one container, and rotation using an item iterating process, inserts the selected item into the space with the item oriented according to the selected rotation, and updates the empty space list. Three dimensional packing module 16 also updates the placed item list and the unplaced item list. Three dimensional packing module 16 may then control system 10 to have display 24 show the three dimensional simulation of the items loaded on the at least one container.

As mentioned above, three dimensional packing module 16 may receive, as input, a resource or container and a list of items to be packed into that container. In addition to weight, volume, and equipment reference units (ERUs), three dimensional packing module 16 can take into account the dimensions of the container(s) and items. For instance, the items may be rectangular shaped, cylindrical shaped, or any other shaped item. ERU refers to a generic capacity that extends the concept of weight and volume to other dimensions. The ERU can be defined by a user. ERU includes two dimensions: limit and maximum. In one embodiment, the limit refers to a count of the permissible number of ERUs allowed in the equipment or compartment based on a count of what is physically possible to place therein. In another embodiment, the limit may also be used as an arbitrary measure to limit the count or even prohibit placement. Accordingly, in one embodiment, the limit can be used to limit the number of items to be placed, for example, based on a business restriction or constraint and not due to physical volume constraints. The maximum refers to the actual percentage of space being used and this allows the placement of other ERUs. For example, if an item had an ERU of 1 such that only 10 of those items could physically fit in the equipment, but, theoretically, by volume, the equipment could fit 13, then the limit would be 10 and the maximum would be 13.

Using a three dimensional placement algorithm, for example, three dimensional packing module 16 can place one item at a time in the container(s). While placing each item, three dimensional packing module 16 can use logic to ensure that any placement constraints, in addition to the weight and volume constraints are met. As a result, three dimensional packing module 16 can determine the exact position where each item should be placed in the container.

Therefore, embodiments of the invention can provide a three dimensional model or simulation of different shaped items efficiently loaded into different shaped containers of given dimensions. In addition, three dimensional packing module 16 provides a user with multiple ways to specify how items should be sorted to form a sequence to be loaded and also provides the user with a mechanism to specify how spaces in a container are evaluated. For example, the user could specify that the items need to be sorted in the decreasing order of their volumes. In this case, the largest piece in terms of volume is placed first and the smallest one is placed at the end. The advantage of such an approach is that once the bigger objects are placed, the smaller objects are more likely to fit in the space left over after placing the larger objects and thereby result in a tight packing. The user may also specify the sorting based on the largest dimension instead of volume. This would give the users freedom to choose the best way to sort the objects based upon their business requirements or preferences.

Thus, three dimensional packing module 16 can handle a number of constraints to produce an efficient simulation of load packing and to provide the user with a customizable solution that meets their specific requirements or constraints. At least the following constraints can be handled:

Dimensions of the product
Dimensions of the container
Weight Capacity
Volume Capacity
Equipment Reference Units (ERUs).
Compartments—containers have compartments and each compartment has its dimensions and weight, volume and equipment reference unit constraints.
Obstructions—containers and compartments can have obstructions and hence the objects must be placed around these obstructions. Examples of obstructions include pillars near the doors, bumps on top of the tires, etc.
Commodity restrictions on containers and compartments. For example, items that need refrigeration can only be placed in refrigerated compartment. Fertilizers cannot be packed in the same compartment as food items.
Multi-stop constraints—as goods are picked up or delivered at various stops, new spaces become available for loading additional boxes. The three dimensional load packing 16 logic must understand this new space when loading additional boxes. Also, packing must be done in order to minimize reloads—thus following a LIFO scheme.
Multi-stops can also have the requirement that boxes of one stop cannot be loaded on top of boxes from other stop. However, in some embodiments, multi-stop mixing rules allow this requirement to be relaxed, if desired. Multi-stop mixing rules can be setup so that items are completely segregated based on stops, items for different stops are placed side by side, or items for different stops are placed on top of each other.
Constraints on how boxes can be loaded. Certain boxes can be loaded in only a certain orientations, such as washers and dryers can only be loaded upright. Some boxes must be loaded on the floor of the equipment.
Stacking limitations—maximum number of layers to stack, limitations on what item types can stack on top of a particular item.
Curved Roofs on equipment—for instance, some European railcars have curved roofs which enable them to stack slightly higher in the center of equipment.

Figure 2:
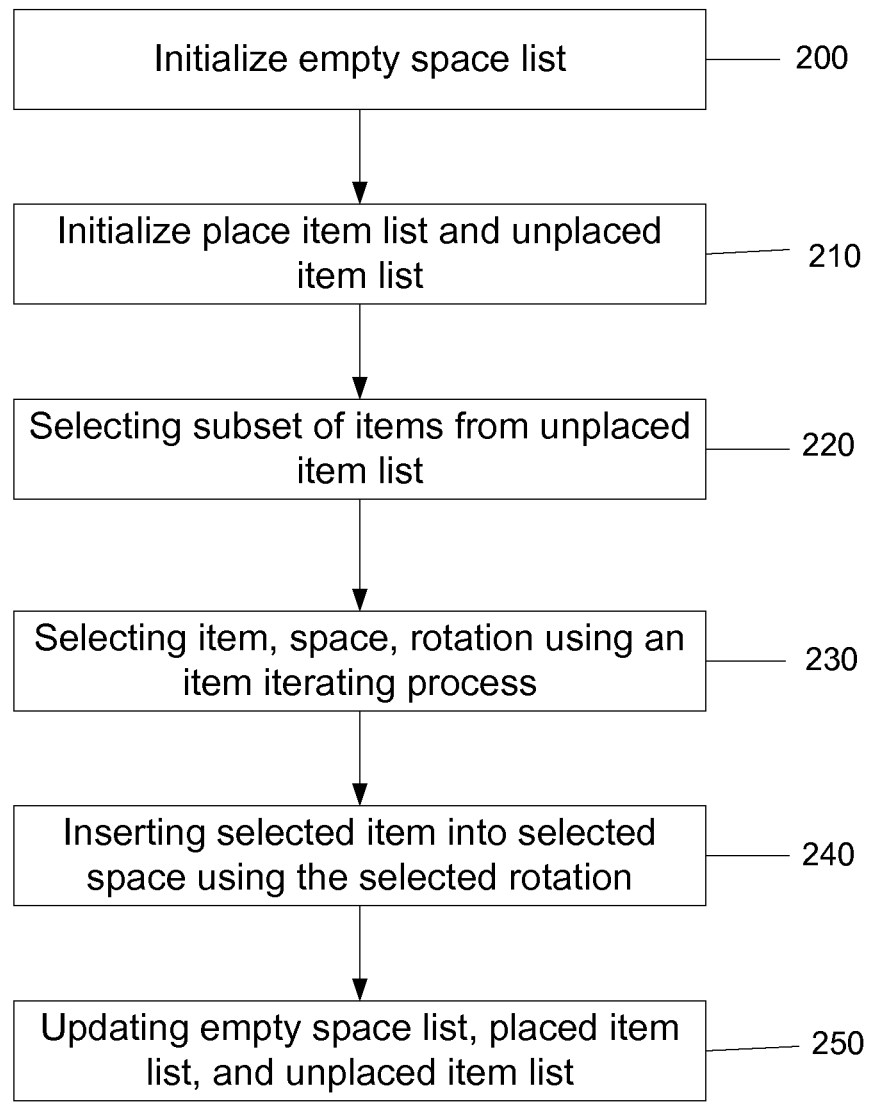
FIG. 2 illustrates a flow diagram according to an embodiment.

FIG. 2 illustrates a flow diagram of the functionality of three dimensional packing module 16, according to one embodiment. It should be noted that the functionality of the flow diagram depicted in FIG. 2, as well as FIG. 3 below, can be implemented by software stored in memory or other computer readable or tangible media, and executed by a processor. In other embodiments, the functionality can be executed by hardware (e.g., through the use of an application specific integrated circuit (ASIC), a programmable gate array (PGA), a field programmable gate array (FPGA), or any combination of software and hardware. At 200, at empty space list is initialized to include one space equal to the size of the container(s) to be loaded. At 210, a placed item list and an unplaced item list are initialized. The placed item list includes a list of items already loaded on the container(s) and the unplaced item list includes a list of items that are yet to be loaded on the container(s). Then, at 220, a subset of items is selected from the unplaced item list. The subset of items may, for example, be destined for the same destination. While there are more items to be loaded on the container(s), an item from the subset of items, a space in the container(s), and a rotation for the item are selected using an item iterating process at 230. The item iterating process will be discussed in more detail below with respect to FIG. 3. At 240, the selected item is inserted into the selected space, with the item oriented according to the selected rotation. Then, at 250, the empty space list, placed item list, and unplaced item list are updated to reflect the insertion of the selected item, into the selected space, using the selected rotation.

Figure 3:
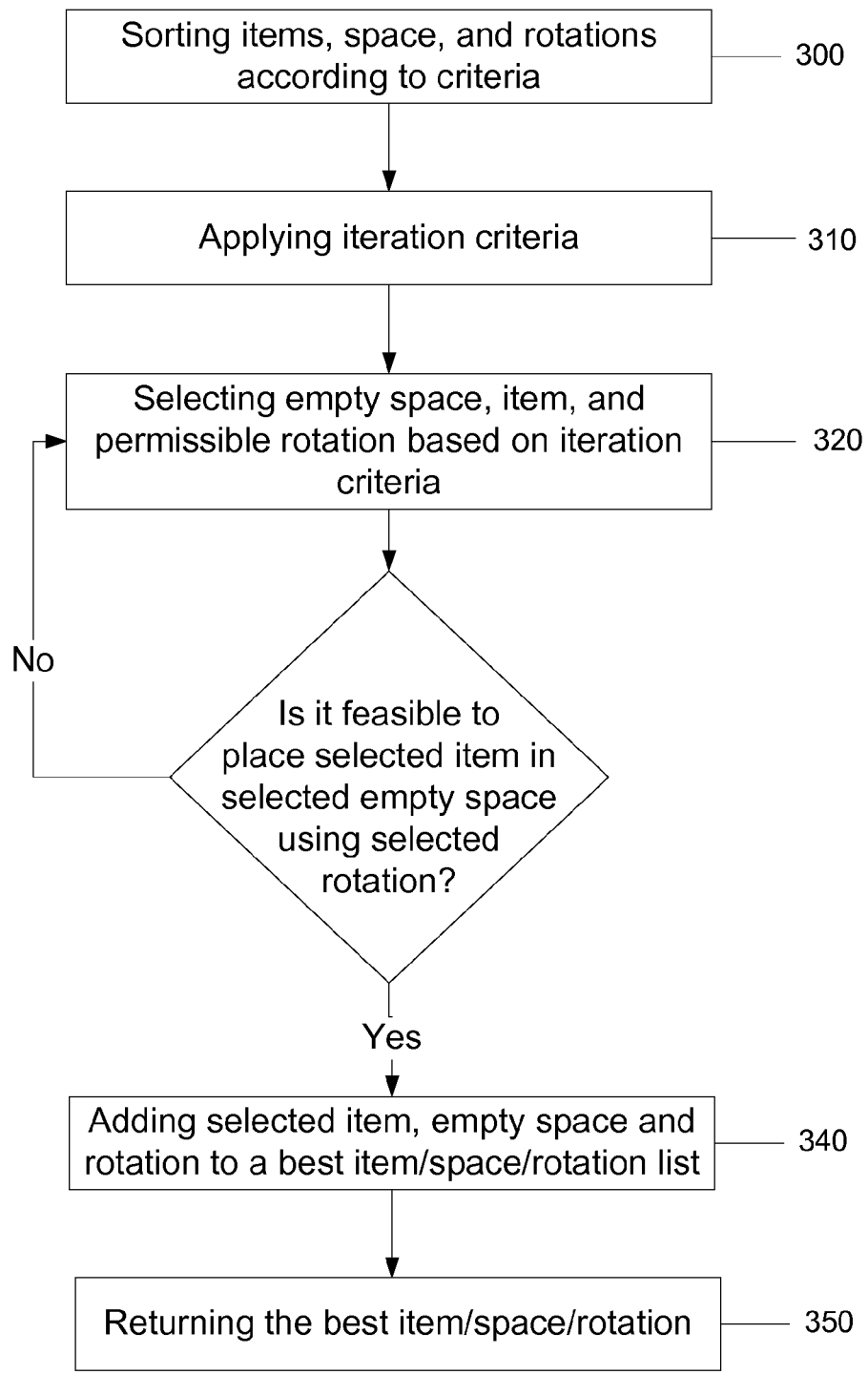
FIG. 3 illustrates a flow diagram according to another embodiment.

FIG. 3 illustrates a flow diagram of the item iterating process (230 of FIG. 2), according to an embodiment of the invention. At 300, the process includes sorting items, spaces, and rotations according to an item sort criteria, empty space sort criteria, and rotation sort criteria, respectively. These sort criteria will be discussed in more detail below. At 310, the process includes applying an iteration criteria that determines which of the spaces, items, and rotations are considered first, second and last in the selection. At 320, while empty spaces are available in the container(s), the process includes selecting an empty space, item, and permissible rotation based on the iteration criteria. Then, at 330, it is determined whether it is feasible to place the selected item in the selected empty space using the selected rotation. If it is not feasible, the process returns to 320 to make another selection. If, however, the placement is found feasible then the process includes adding the selected item, the selected empty space, and the selected rotation to a best item/rotation space list at 340. Additionally or alternatively, the process may include providing the selected item, the selected empty space, and the selected rotation to be inserted at 240 of FIG. 2 discussed above. In one embodiment, the process may further include, at 350, returning the best item/space/rotation from the best item/rotation space list.

Several parameters can be specified by a user to customize the three dimensional load packing process and its output. One example are the load configuration parameters. The load configuration parameters include a load placement iteration criteria that specifies the emphasis for spaces, items, and rotations. The load placement iteration criteria may determine which of the spaces, items, and rotations is considered first when packing module 16 is modeling the loading of a container. Possible values for the load placement iteration criteria include: [space, item, rotation], [space, rotation, item], [item, space, rotation], [item, rotation, space], [rotation, item, space], and [rotation, space, item].

For instance, if the load placement iteration criteria indicates [space, item, rotation], the space is selected first and then items will be attempted to be placed into the selected space in different orientations (rotations). As another example, if the load placement iteration criteria indicates [item, rotation, space], an item is selected first, followed by a rotation, and then an appropriate space will be determined that can fit the already selected item and rotation. Further, if the load placement iteration criteria indicates [item, space, rotation], an item is selected first, followed by a space, and then an appropriate rotation for the item and space is determined.

Generally, an item will have rotations equal to the number of its sides. For example, a box would have six possible rotations.

Figure 4:
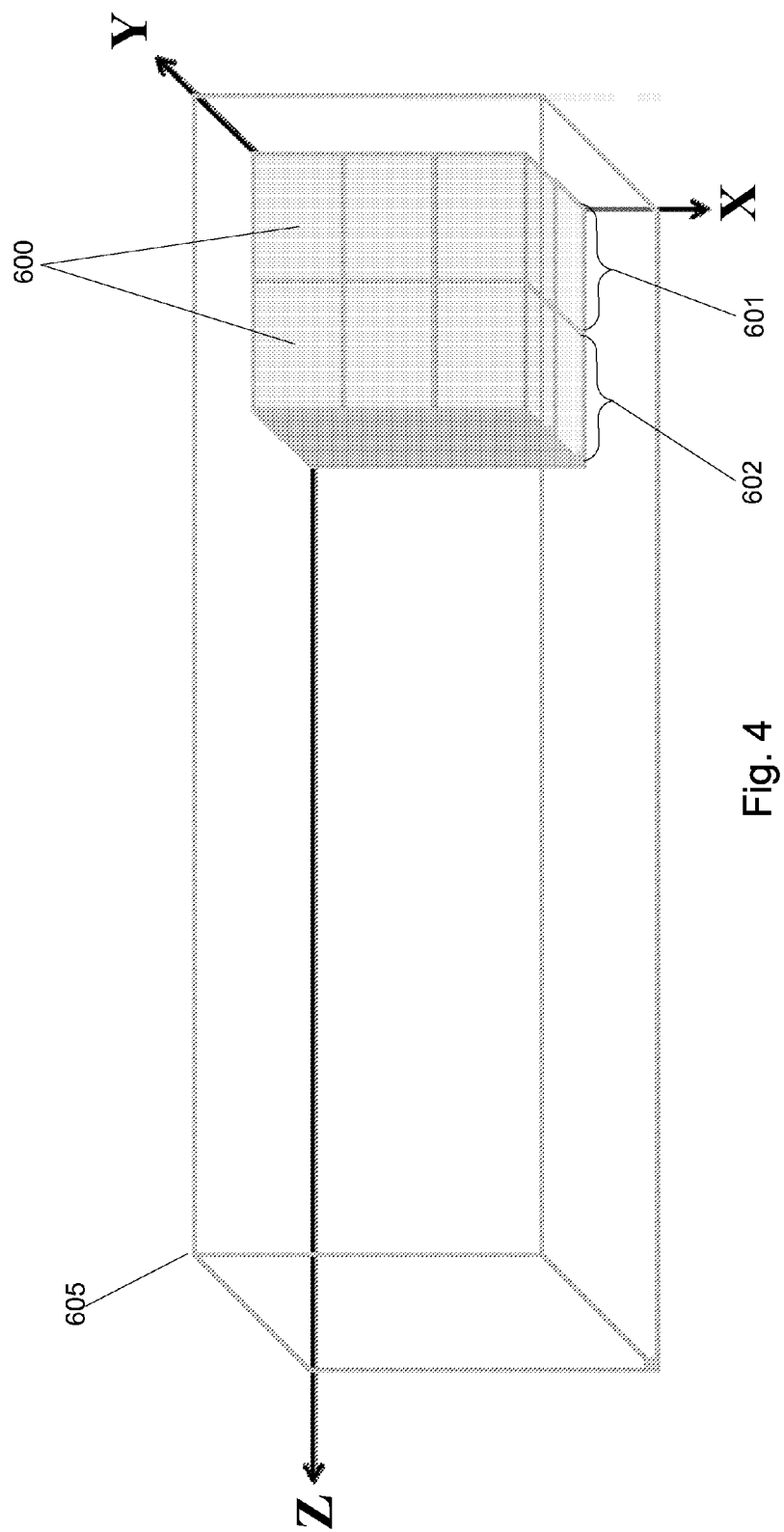
FIG. 4 illustrates a sample of a container loaded according to one embodiment.

The load configuration parameters can also include sorting criteria for the items, spaces, and rotations. For example, an empty space sort criteria specifies the sort criteria for empty spaces. In other words, the empty space sort criteria helps determine which of the empty spaces in an empty space list are selected first. Therefore, the empty space sort criteria has an influence on where the next item will be place in the container. Possible values for the empty space sort criteria include: [width, height, length], [width, length, height], [height, width, length], [height, length, width], [length, height, width], [length, width, height]. FIG. 4 illustrates an example of a container with items placed according to a [width, height, length] empty space sorting criteria. In the example of FIG. 4, because width is the first element of the empty space sorting criteria, items 600 are loaded such that a row 601 of items are first placed across the width of container 605. Next, row 601 is stacked with another set of items 600 in the vertical direction since height is the second element of the empty space sorting criteria in this example. Then, another row 602 of items 600 is placed in the length direction of container 605 as length is the final element of the empty space sorting criteria in this example.

Figure 5:
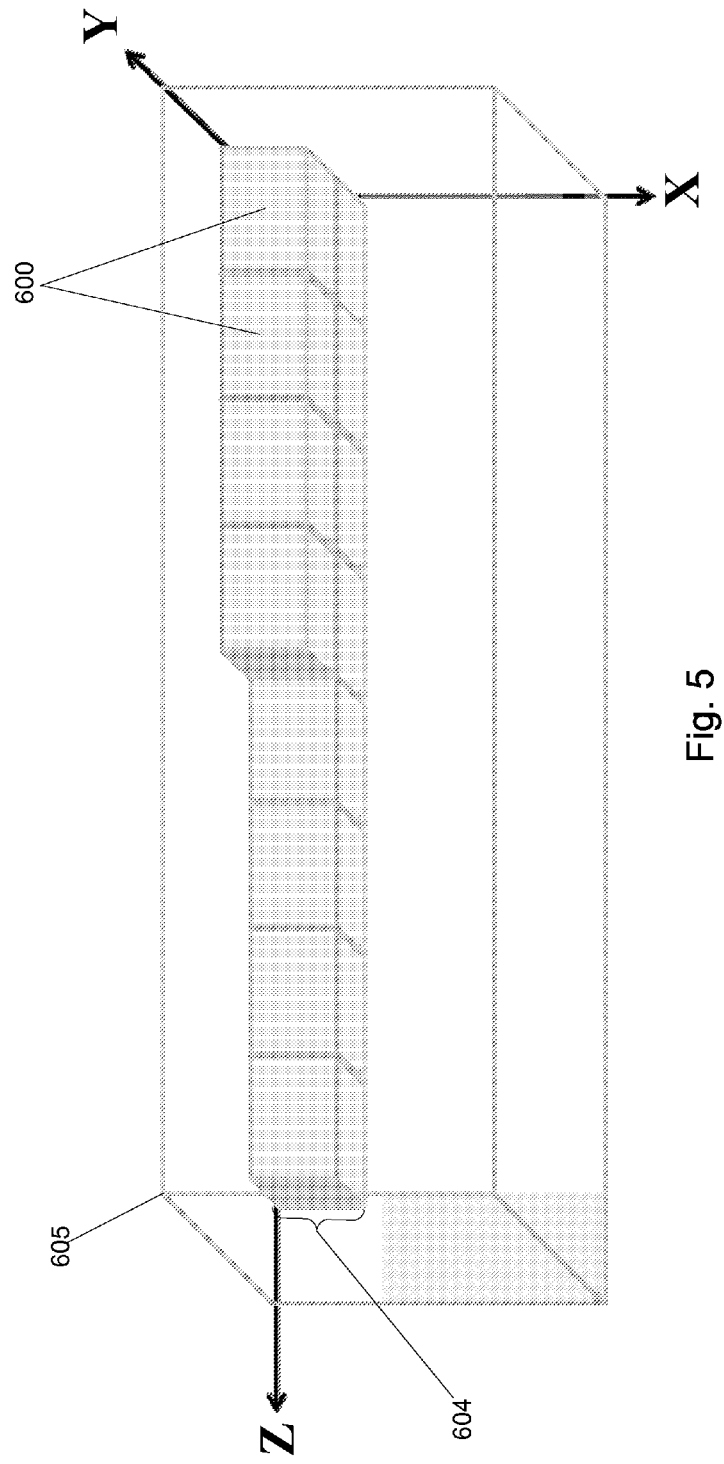
FIG. 5 illustrates a sample of a container loaded according to one embodiment.
Figure 6:
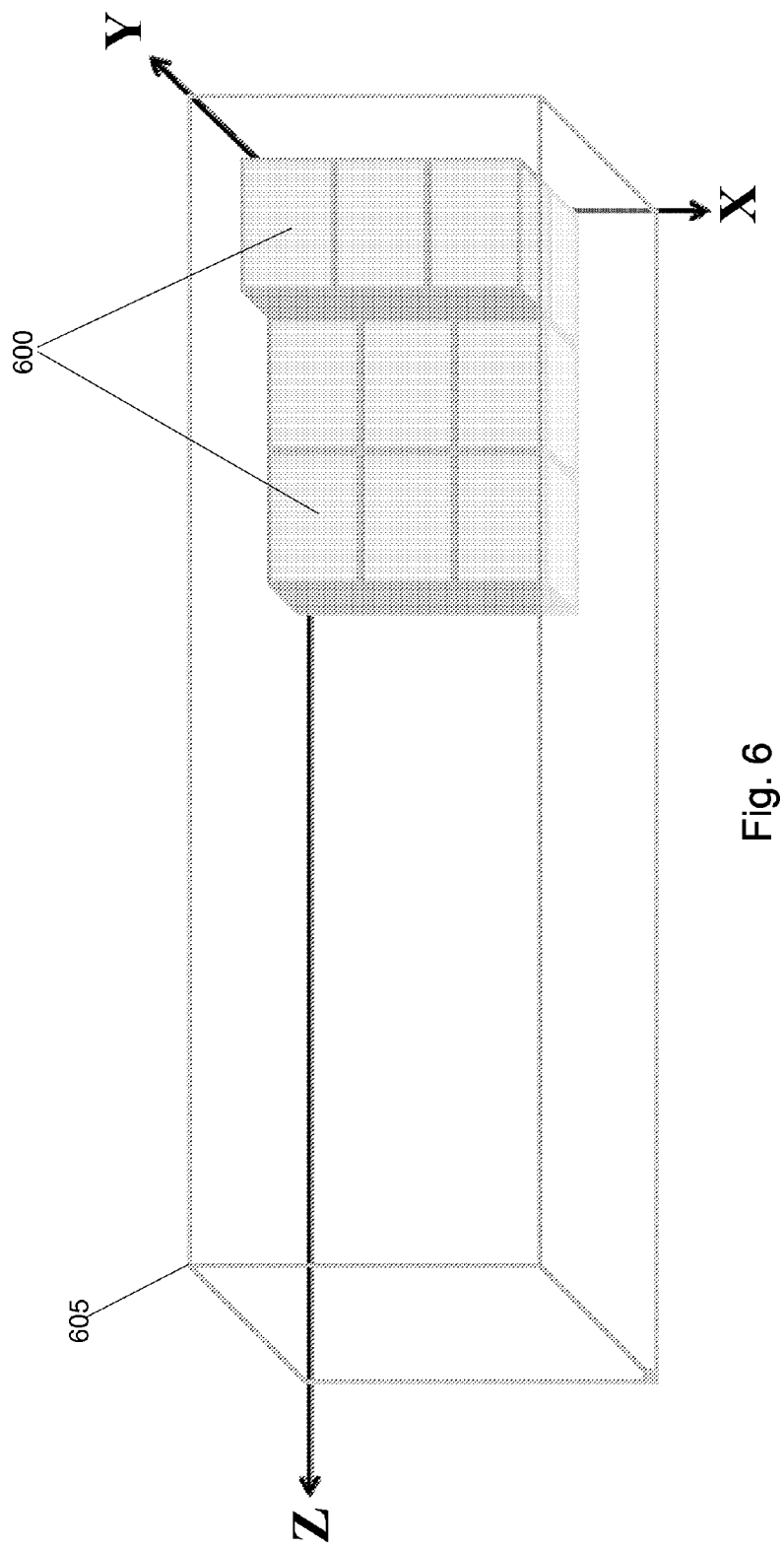
FIG. 6 illustrates a sample of a container loaded according to one embodiment.

FIG. 5 illustrates an example of a container with items placed according to a [length, height, width] empty space sorting criteria. In the example of FIG. 5, since length is the first element of the empty space sorting criteria, items 600 are loaded such that a column 604 of items are first placed along the length of container 605. Items 600 are then stacked according to the second element, height, of the empty space sorting criteria. FIG. 6 illustrates an example of a container with items placed according to a [width, length, height] empty space sorting criteria. In the example of FIG. 6, items 600 will first be placed across the width of container 605, followed by the length of container 605, and then stacked to the height of container 605.

An item sort criteria specifies the sort criteria for items. In one embodiment, a user may set the item sort criteria to sort items by largest volume, largest surface, largest dimension, most dense, and/or stacking index. For example, if the item sort criteria is set to largest volume, then the item with the largest volume will be selected first from the unpacked item list.

A rotation sort criteria specifies the sort criteria for rotations. In other words, the rotation sort criteria specifies which rotation will be attempted first. Possible values for the rotation sort criteria include: [upright, onside, prone], [upright, prone, onside], [onside, upright, prone], [onside, prone, upright], [prone, upright, onside], and [prone, onside, upright].

Figure 7:
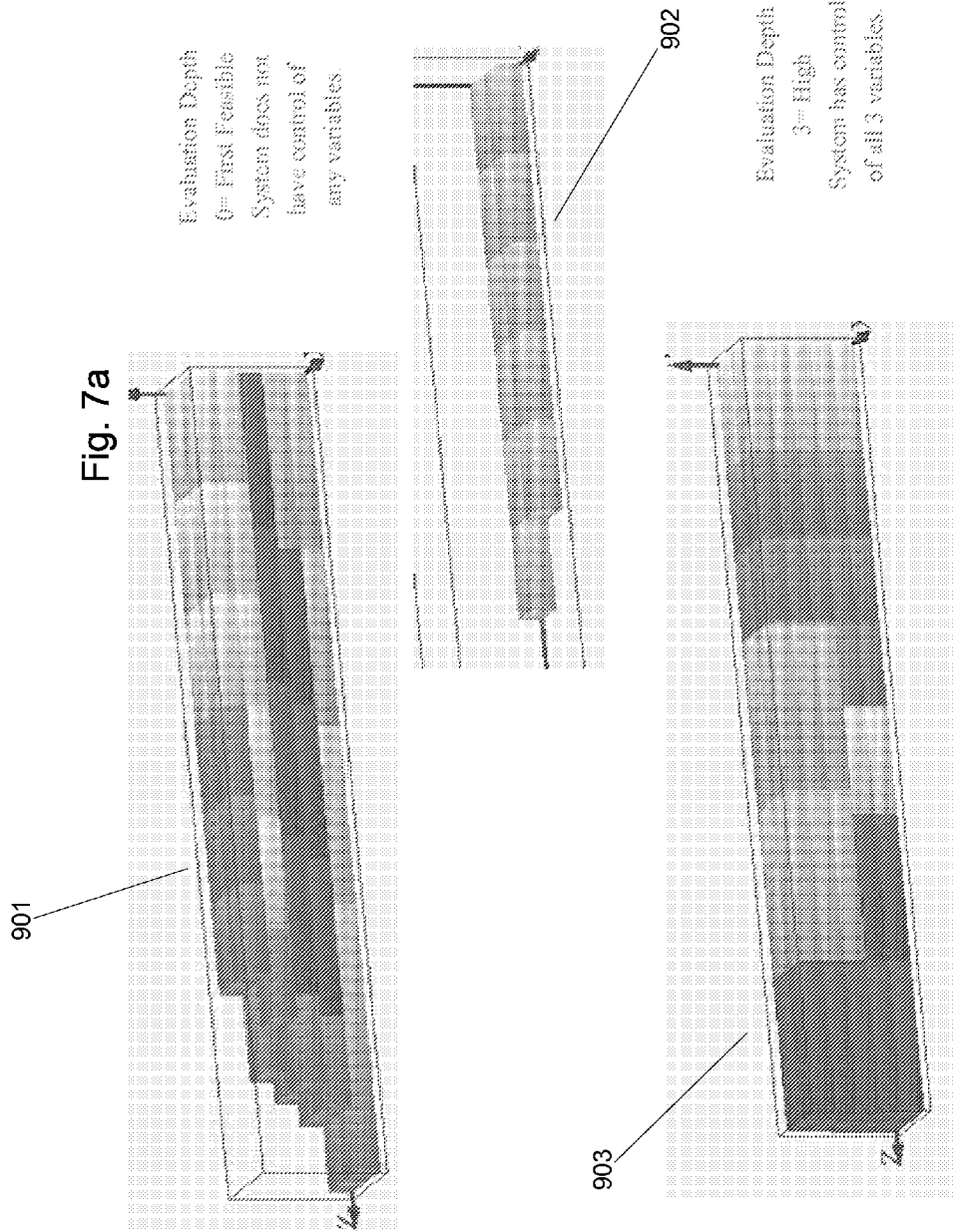
FIG. 7*a* illustrates a sample of a container loaded according to one embodiment.
FIG. 7*b* illustrates a sample of a container loaded according to one embodiment.

Furthermore, an evaluation depth can be specified to the three dimensional packing 16. The evaluation depth indicates how much control the user would like to maintain over the modeling process. Possible values include 0 to 3, with 0 meaning that the user has full control and 3 meaning full evaluation by the three dimensional packing module 16. FIG. 7a illustrates an example of a simulation result using an evaluation depth of 0. As can be seen in FIG. 7a, while an evaluation depth of 0 provides a faster solution, the simulation results in two containers 901 and 902 being required because only one solution is evaluated in accordance with the selected evaluation depth of 0. FIG. 7b, however, illustrates an example of a simulation result using an evaluation depth of 3. As can be seen in FIG. 7b, the simulation results in a single tightly packed container 903 because a deeper evaluation was conducted.

Figure 8:
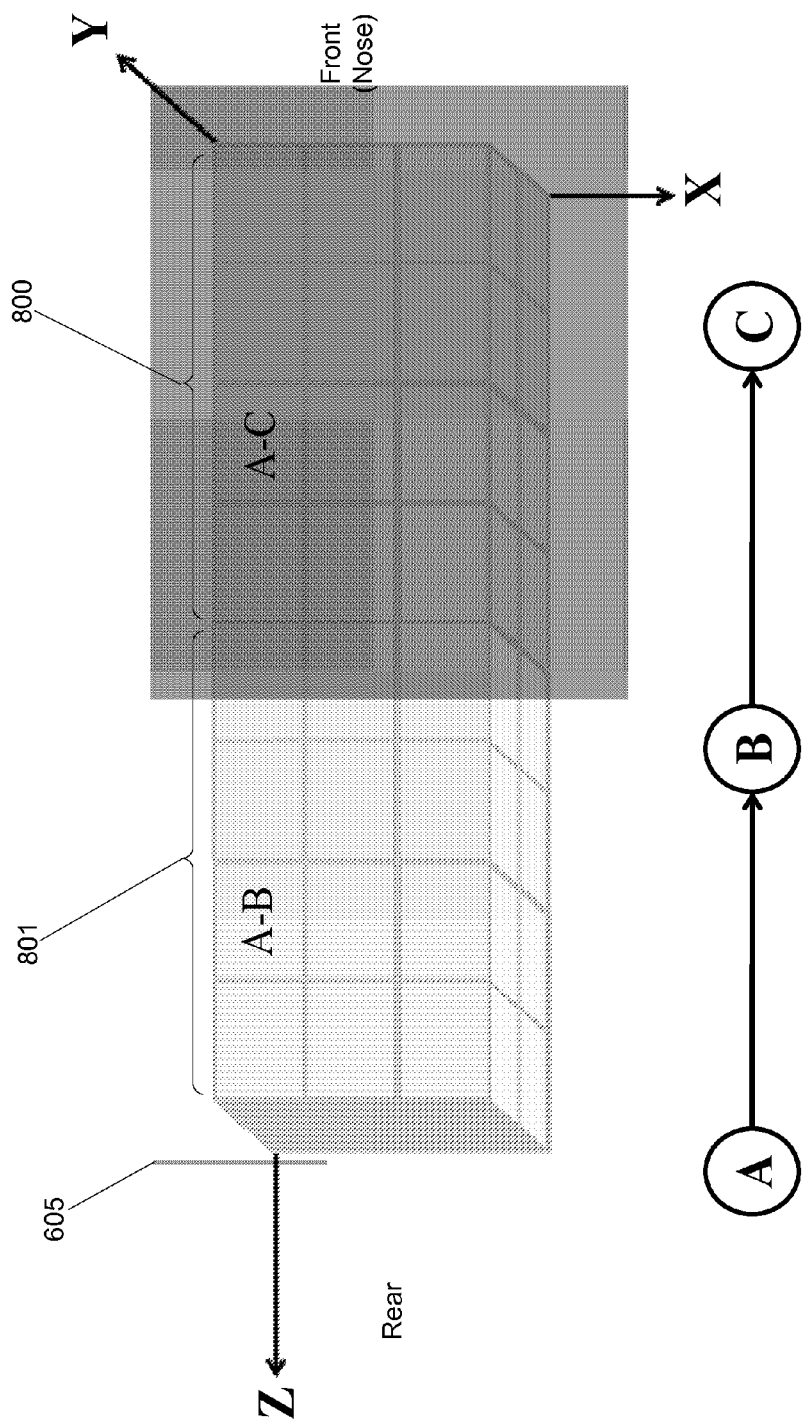
FIG. 8 illustrates a sample of a container loaded according to one embodiment.

Additionally, according to an embodiment, three dimensional packing module 16 can provide a solution that loads a container with multiple stops while taking into account the destinations for each of the items. FIG. 8 illustrates an example of how container 605 may be loaded taking into account multiple stops. In this example, items 800 that are traveling from point A to point C are loaded first, and items 801 that are traveling from point A to point B are loaded second (towards the rear of container 605) allowing them to be easily unloaded at point B.

According to an embodiment, a multi-stop mixing rule parameter may be provided to control how items going to different stops get mixed while being loaded on the container. For instance, the multi-stop mixing rule parameter may indicate that no mixing is allowed, that only widthwise mixing is allowed, that widthwise and stacking mixing is allowed, or that widthwise and stacking mixing are allowed for last row only.

Further, according to certain embodiments, three dimensional packing module 16 can provide a solution that handles packing of items into specialized compartments of a container. Certain items may have compartment constraints that require the items to be loaded into a specific type of compartment within a container. For example, milk or other dairy products must be loaded into a refrigerated compartment. Three dimensional packing module 16 is capable of accepting a compartment constraint associate with an item. In one embodiment, the compartment constraint may be stored in database system 30. When simulating the packing of a container, three dimensional packing module 16 can retrieve the compartment constraint from database system 30 (along with any other constraints or parameters) and ensure that any packing of an item complies with the compartment constraint for that item.

Figure 9:
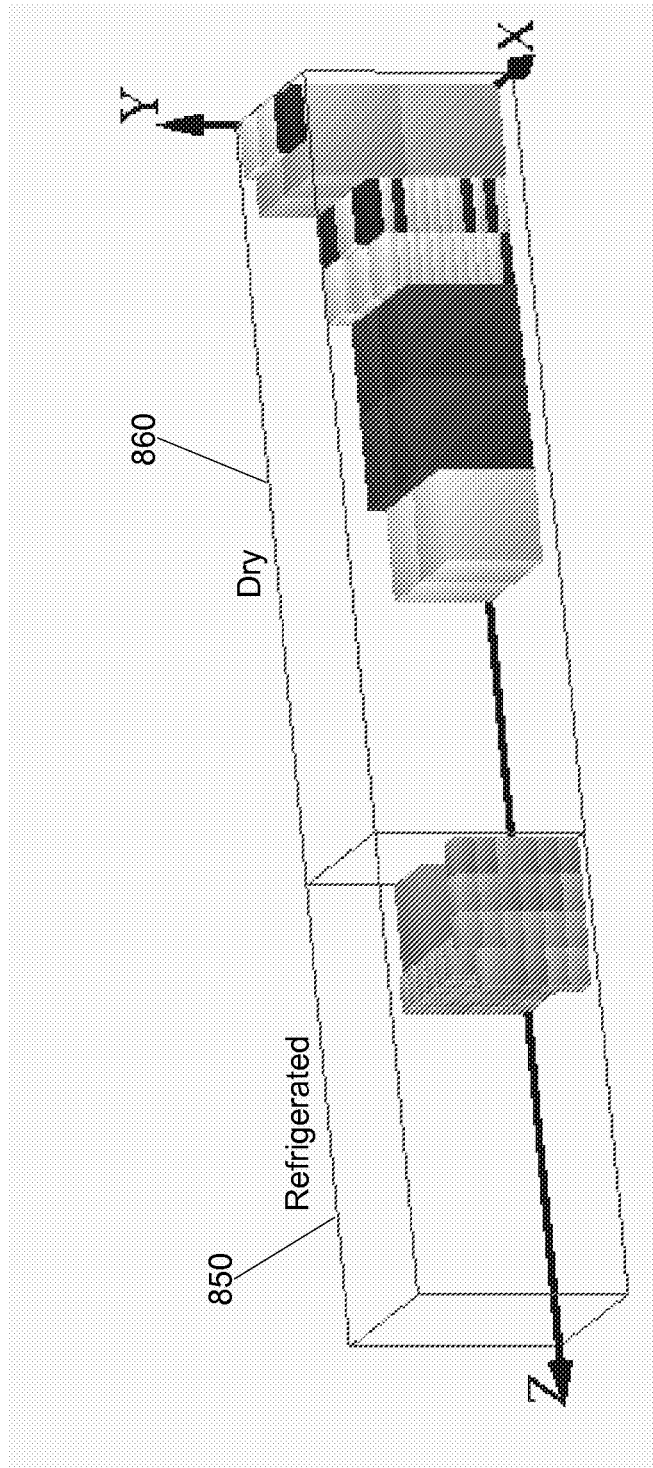
FIG. 9 illustrates a sample of a container loaded according to one embodiment.

FIG. 9 illustrates an example of a container with two separate compartments 850 and 860. Compartment 850 is a refrigerated compartment, and compartment 860 is a dry compartment. When three dimensional packing module 16 simulates the packing of a container, it will determine the type of compartment that an item should be loaded into based on the compartment constraint associated with the item. For instance, when the item is milk, the compartment constraint associated with the milk will indicate that the milk should be loaded into a refrigerated compartment. Three dimensional packing module 16 will recognize this compartment constraint and load the milk accordingly. In the embodiment shown in FIG. 9, for example, items such as milk, cheese, or meat will be loaded into refrigerated compartment 850. Items such as paper towels, toilet paper, dog food, soap bars, bread, and the like will be loaded in dry compartment 860. Accordingly, three dimensional packing module 16 is able to ensure that items are appropriately packed in a manner that maintains their freshness while complying with constraints associated with the business that is shipping the items as well as constraints associated with the items themselves.

In view of the above, embodiments of the invention are able to optimize the equipment used for transporting items and also optimize the way that items are loaded into the equipment. Additionally, embodiments of the invention have the advantage of allowing users to customize the loading of items and the selection of equipment to suit their specific requirements. This is because embodiments of the invention are able to handle a number of business constraints. Further, embodiments of the invention can also handle load configuration specific constraints, such as curved roof, door height, stacking height, floor loading, stacking layer feasibility, overhang constraint, load bearing weight, orientation feasibility, and stacking index constraints.

It should be noted that many of the functional features described in this specification have been presented as modules, applications or the like, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code or algorithm could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A tangible computer readable medium having instructions stored thereon that, when executed by a processor, cause the processor to perform a process comprising:
   receiving a list of items to be transported, at least one of the items being a different shape or size from another of the items;
   determining at least one container as an optimal number and a type of container to be used for transporting the items;
   initializing an empty space list that lists empty spaces available within the at least one container;
   initializing a placed item list and an unplaced item list, wherein the placed item list comprises a list of items already loaded on the at least one container and the unplaced item list comprises a list of items to be loaded on the at least one container; and
   determining an optimal arrangement of the items to be transported in the at least one container by, while there are more items to be loaded on the at least one container:
      performing an item iterating process comprising:
         sorting the unplaced items in the unplaced item list according to an item sort criteria;
         sorting the empty spaces in the empty space list according to an empty space sort criteria;
         sorting rotations according to a rotation sort criteria;
         applying iteration criteria that determines an order between an unplaced item selection, an empty space selection, and a rotation selection; and
         selecting, in said order, (1) an item from the sorted unplaced item list, (2) an empty space from the sorted empty space list, and (3) a rotation from the sorted rotations;
      inserting the selected item into the selected space, the item oriented according to the selected rotation;
      updating the empty space list to reflect insertion of the selected item; and
      updating the placed item list to include the selected item and the unplaced item list to delete the selected item.

2. The computer readable medium according to claim 1, wherein the process performed by executing the instructions further comprises displaying a three dimensional simulation of the items loaded on the at least one container.

3. The computer readable medium according to claim 1, wherein the iteration criteria includes at least one constraint selected from: container dimension, item dimension, weight capacity, volume capacity, equipment reference unit, container compartment restriction, container obstruction, commodity restriction, multi-stop constraint, stacking limitation, item orientation, or container shape variation.

4. The computer readable medium according to claim 1, wherein the selection for the second in said order being based on the selection for the first in said order, and the selection for the third in said order being based on the selection for the first and second in said order.

5. The computer readable medium according to claim 1, wherein the respective sort criteria determines an order of selection from the respective list.

6. The computer readable medium according to claim 1, wherein the applying the iteration criteria and selecting in said order comprises selecting the unplaced item before the rotation, and the selected rotation is one that is permissible for the selected item.

7. The computer readable medium according to claim 6, wherein the item iterating process further comprises:
   evaluating a feasibility of placing the selected item in the selected empty space using the selected rotation; and
   if the evaluating indicates that it is feasible,
      based on an evaluation depth, adding the selected item, the selected empty space, and the selected rotation to a best item/rotation/space list, or providing the selected item, the selected empty space, and the selected rotation for the inserting.

8. The computer readable medium according to claim 1, wherein the determining an optimal arrangement of the items to be transported comprises arranging a first subset of items having a first stop during transport in a space of the at least one container separate from a space in which a second subset of items having a second stop during transport are arranged, the first and second stops being different from each other.

9. The computer readable medium according to claim 8, wherein the first stop is before the second stop in the transport, and the determining comprises selecting the first subset of items after the second subset of items.

10. The computer readable medium according to claim 1, wherein the determining an optimal arrangement of the items to be transported comprises arranging a first subset of items in a specialized compartment of the at least one container separate from a space in which a second subset of items are arranged, the specialized compartment isolating the first subset of items from the second subset.

11. The computer readable medium according to claim 10, wherein the specialized compartment is a refrigerated compartment.

12. An apparatus, comprising:
a packing module configured to:
receive a list of items to be transported, at least one of the items being a different shape or size from another of the items;
determine at least one container as an optimal number and a type of container to be used for transporting the items;
initialize an empty space list that lists empty spaces available within the at least one container;
initialize a placed item list and an unplaced item list, wherein the placed item list comprises a list of items already loaded on the at least one container and the unplaced item list comprises a list of items to be loaded on the at least one container; and
determine an optimal arrangement of the items to be transported in the at least one container by, while there are more items to be loaded on the at least one container:
performing an item iterating process comprising:
sorting the unplaced items in the unplaced item list according to an item sort criteria;
sorting the empty spaces in the empty space list according to an empty space sort criteria;
sorting rotations according to a rotation sort criteria;
applying iteration criteria that determines an order between an unplaced item selection, an empty space selection, and a rotation selection; and
selecting, in said order, (1) an item from the sorted unplaced item list, (2) an empty space from the sorted empty space list, and (3) a rotation from the sorted rotations;
inserting the selected item into the selected space, the item oriented according to the selected rotation;
updating the empty space list to reflect insertion of the selected item; and
updating the placed item list to include the selected item and the unplaced item list to delete the selected item.

13. The apparatus according to claim 12, wherein the packing module is further configured to control a display to show a three dimensional simulation of the items loaded on the at least one container.

14. The apparatus according to claim 12, wherein the applying the iteration criteria and selecting in said order comprises selecting the unplaced item before the rotation, and the selected rotation is one that is permissible for the selected item.

15. A computer-implemented method for simulating loading of items into at least one container to be transported to at least one destination, the method comprising:
receiving a list of items to be transported, at least one of the items being a different shape or size from another of the items;
determining at least one container as an optimal number and a type of container to be used for transporting the items;
initializing an empty space list that lists empty spaces available within the at least one container;
initializing a placed item list and an unplaced item list, wherein the placed item list comprises a list of items already loaded on the at least one container and the unplaced item list comprises a list of items to be loaded on the at least one container; and
determining an optimal arrangement of the items to be transported in the at least one container by, while there are more items to be loaded on the at least one container:
performing an item iterating process comprising:
sorting the unplaced items in the unplaced item list according to an item sort criteria;
sorting the empty spaces in the empty space list according to an empty space sort criteria;
sorting rotations according to a rotation sort criteria;
applying iteration criteria that determines an order between an unplaced item selection, an empty space selection, and a rotation selection; and
selecting, in said order, (1) an item from the sorted unplaced item list, (2) an empty space from the sorted empty space list, and (3) a rotation from the sorted rotations;
inserting the selected item into the selected space, the item oriented according to the selected rotation;
updating the empty space list to reflect insertion of the selected item; and
updating the placed item list to include the selected item and the unplaced item list to delete the selected item.

16. The method according to claim 15, further comprising:
displaying a three dimensional simulation of the items loaded on the at least one container.

17. The method according to claim 15, wherein the applying the iteration criteria and selecting in said order comprises selecting the unplaced item before the rotation, and the selected rotation is one that is permissible for the selected item.

* * * * *